April 28, 1970  A. R. TENNISON  3,508,369
CLOSURE FOR AN EXPANSION JOINT
Filed April 11, 1968  2 Sheets-Sheet 1

INVENTOR.
ARTHUR R. TENNISON
BY Pearce & Schaeperklaus
Attorneys

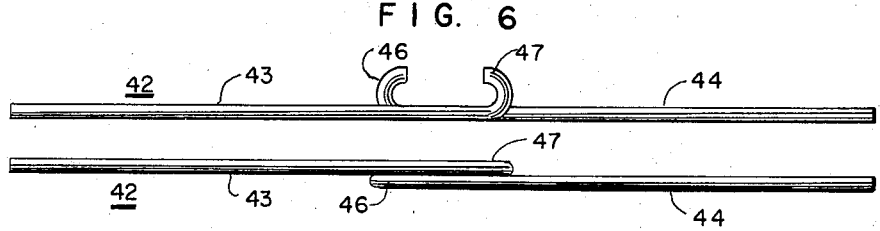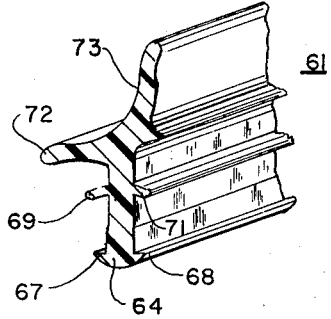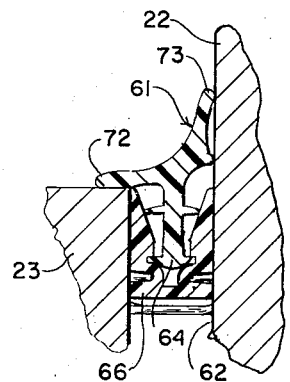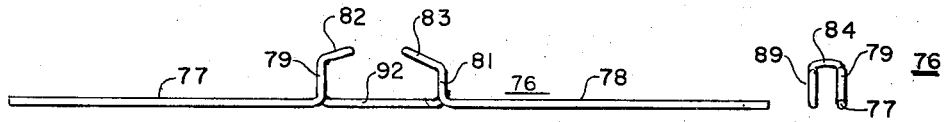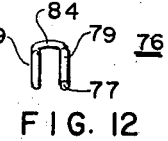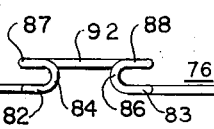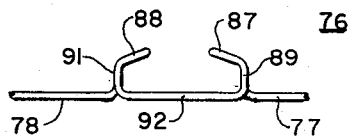

//  # United States Patent Office 3,508,369
Patented Apr. 28, 1970

3,508,369
CLOSURE FOR AN EXPANSION JOINT
Arthur R. Tennison, 4041 Edwards Road, Batavia
Township, Clermont County, Ohio 45209
Filed Apr. 11, 1968, Ser. No. 720,611
Int. Cl. E01c 11/10
U.S. Cl. 52—396                                                      3 Claims

ABSTRACT OF THE DISCLOSURE

An assembly for bridging an expansion joint which comprises an elongated insert strip of channel shape for mounting in the expansion joint and an elongated bridging strip having a leg portion receivable in the interior of the insert strip, and outwardly extending wall engaging flanges for bridging the expansion joint.

---

This invention relates to expansion joints for masonry surfaces such as masonry walls and the like. More particularly this invention relates to a closure for an expansion joint.

An object of this invention is to provide a sealing assembly for an expansion joint having an exposed strip which bridges the joint and which can accommodate limited movement of masonry members at opposite edges of the expansion joint.

Briefly, this invention provides a sealing arrangement for an expansion joint which includes a first elongated, generally channel-shaped insert strip member which is mounted in the expansion joint as a masonry wall or the like is constructed and a second elongated bridging strip member of generally T-shape having a strip portion which bridges the joint and a leg portion which is received between flanges of the insert member. Teeth on the leg portion are received in grooves in inner walls of the flanges to lock the bridging member in place in assembled relation with the insert member. Positioning members which engage the insert are held in the mortar of mortar joints to hold the insert in position.

The above and other objects and features of the invention will be apparent to those of ordinary skill in the art to which this invention pertains from the following detailed description and the drawings, in which:

FIG. 6 is a plan view of a positioning member forming a portion of the sealing arrangement;

FIG. 7 is a view in front elevation of the positioning member shown in FIG. 6;

FIG. 8 is a perspective view of a bridging strip member for a corner joint;

FIG. 9 is a view in section taken on the line 9—9 in FIG. 1;

FIG. 10 is a bottom plan view of another form of positioning member for the sealing arrangement;

FIG. 11 is a view in front elevation of the positioning member shown in FIG. 10;

FIG. 12 is a view in side elevation of the positioning member shown in FIGS. 10 and 11; and FIG. 13 is a fragmentary top plan view of the positioning member shown in FIGS. 10–12 inclusive.

In the following detailed description and the drawings, like reference characters indicate like parts.

Figure 1:
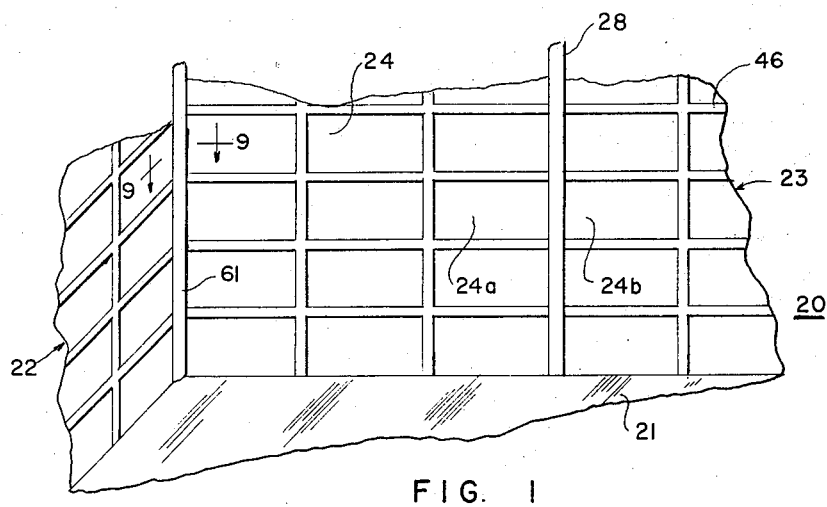
FIG. 1 is a perspective view of a portion of a room having masonry walls provided with expansion joint sealing arrangements constructed in accordance with an embodiment of this invention.
Figures 2, 3:
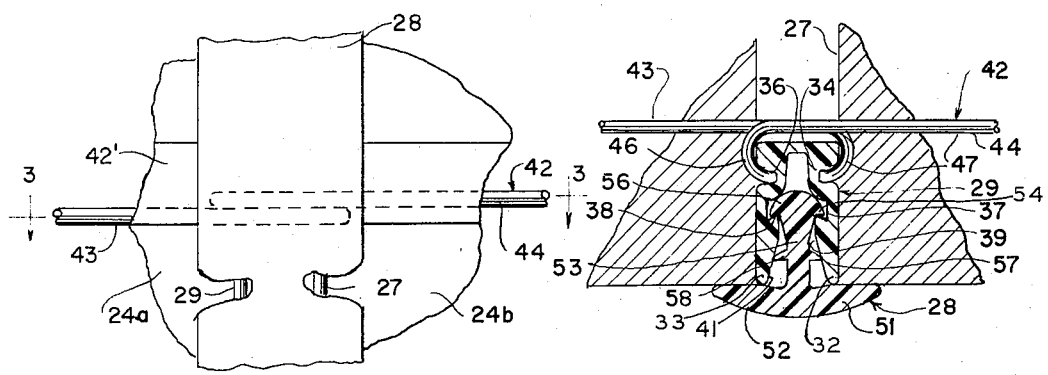
FIG. 2 is an enlarged fragmentary view in side elevation of a portion of a wall of the room shown in FIG. 1, a portion of a bridging member being broken away to reveal details of construction.
FIG. 3 is a view in section taken generally on the line 3—3 in FIG. 2.

In FIG. 1 is shown a fragmentary portion of a room 20 having a floor 21 and walls 22 and 23 formed of concrete blocks 24. As the blocks are laid up, expansion joints are formed between columns of blocks, one of the expansion joints being shown at 27 in FIG. 2 between blocks 24a and 24b. The joint 27 is bridged by a sealing assembly which includes an elongated bridging strip 28 and an elongated insert strip 29 (FIG. 3).

Figure 5:
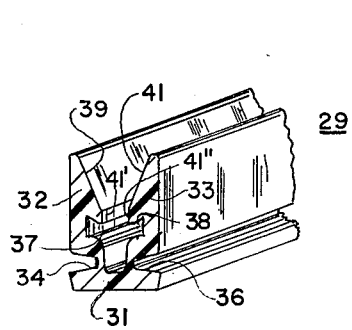
FIG. 5 is a perspective view of a section of an insert strip forming a portion of the sealing arrangement shown in FIGS. 1–3 inclusive.

Details of construction of the insert strip 29 are shown in FIG. 5. The insert strip 29 is of generally channel shape and includes a base portion 31 and flanges 32 and 33. Lengthwise slots 34 and 36 are formed in outer walls of the flanges 32 and 33, respectively. In addition, lengthwise slots 37 and 38 are formed in interior walls 39 and 41 of the flanges 32 and 33, respectively. As shown most clearly in FIG. 3, the major portions of the interior walls 39 and 41 outboard of the slots 37 and 38 slope inwardly and toward the base portion 31. Immediately outboard of the slots 37 and 38, the interior walls 39 and 41 have narrow portions 41′ and 41″ which are substantially parallel. As the blocks are laid in position with mortar strips therebetween, the joint 27 is formed with the insert strip 29 in position therein and outer edges of the flanges 32 and 33 substantially aligned with faces of the blocks and the interior of the insert strip exposed.

The insert strip 29 is held in position in the joint 27 by positioning members 42 (FIG. 3) which are mounted on the insert strip at horizontal mortar strips 42′ (FIG. 2) between blocks. Details of construction of one of the positioning members 42 are shown in FIGS. 6 and 7. The positioning member 42 includes two hook-shaped wire portions 43 and 44 which are attached together with portions thereof in flatwise face-to-face relation and with return bend sections 46 and 47 thereof facing each other to form a pair of inwardly directed jaws. The portions can be soldered or welded together. As shown in FIG. 3, ends of the return bend sections 46 and 47 are received in the lengthwise slots 34 and 36 of the insert member 29 with body sections of the positioning member extending outwardly from the jaws and being received in the mortar of the mortar joint 42′.

Figure 4:
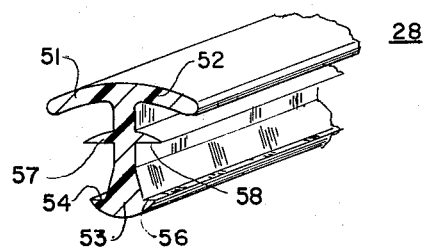
FIG. 4 is a perspective view of a section of a bridging strip forming a portion of the sealing arrangement shown in FIGS. 1 to 3 inclusive.

The expansion joint 27 is bridged and covered by the bridging strip 28. As shown in FIG. 4, the bridging strip 28 is of generally T-shape in section and includes a cross-bar portion having outwardly extending flanges 51 and 52 and a leg portion 53. The leg portion has outwardly extending locking flanges 54 and 56 adjacent the free end thereof and outwardly extending positioning flanges 57 and 58 spaced from but adjacent the cross bar portion. The bridging strip is mounted in the insert strip as shown in FIG. 3 with the leg portion 53 extending between the flanges of the insert member and the locking flanges 54 and 56 received in the lengthwise slots 37 and 38 thereof and the positioning flanges 57 and 58 engaging the inner walls 39 and 41 of the flanges 32 and 33 of the insert strip 29 to hold the leg portion centered in the insert strip. The cross bar flanges 51 and 52 overlie edges of the expansion joint 27 so that the bridging member spans the expansion joint and overlies the exposed edges thereof. The bridging strip 28 and the insert strip 29 can be formed of resilient rubber-like plastic material such as polyvinyl resin or the like. The bridging strip can be mounted in position after the wall has been laid up. The leg portion 53 of the bridging strip 28 is inserted between the flanges of the insert strip and the outer portion of the bridging strip is pushed toward the wall until flanges 54 and 56 enter the slots 37 and 38, whereupon the bridging strip is locked in place.

In FIG. 8 is shown a bridging strip 61 which can be mounted in an expansion joint 62 (FIG. 9) at a corner between the walls 22 and 23 (FIG. 1). The bridging strip 61 can be formed of the same type of material as the bridging strip described hereinbefore and includes a leg portion 64 which can be received between flanges of an insert strip 66 mounted in the expansion joint 62. The leg portion includes locking flanges 67 and 68 (FIG. 8) and positioning flanges 69 and 71 which function as do corresponding parts of the leg portion of the other bridging strip. The bridging strip 61 also includes wall engaging flanges 72 and 73 which extend at substantially right angles to each other and can engage the walls 22 and 23 as shown in FIG. 9 to bridge the expansion joint 62.

In FIGS. 10–13 inclusive is shown a positioning member 76 which can be substituted for the positioning member already described. The positioning member 76 is formed from a single length of wire formed to the shape shown and includes body sections 77 and 78, transverse portions 79 and 81 (FIG. 10) extending substantially perpendicularly to the body sections 77 and 78 respectively, inwardly directed flanges 82 and 83, curved heads 84 and 86 (FIG. 11), flanges 87 and 88 (FIG. 13), transverse portions 89 and 91, and a bridging section 92. The positioning member 76 can be mounted on one of the insert members with curved heads 84 and 86 received in lengthwise slots of the outer walls thereof and the body sections received in mortar joints so that the positioning member locks the insert member in place in an expansion joint.

What I claim as new and desire to secure by Letters Patent is:

1. An assembly for bridging an expansion joint which comprises an elongated insert strip of channel shape adapted to be mounted in the expansion joint with the interior thereof exposed, there being lengthwise slots in interior faces thereof, an elongated bridging strip having a leg portion receivable in the interior of the insert strip, there being outwardly extending locking flanges on the leg engageable in the slots of the insert strip to lock the bridging strip therein, the bridging strip having outwardly extending wall engaging flanges spaced from the locking flanges, the wall engaging flanges being adapted to bridge the expansion joint, there being lengthwise slots in exterior faces of the insert strip, and a positioning member having jaws received in the lengthwise slots in the exterior faces, the positioning member being slidable along the insert strip and having outwardly extending portions receivable in walls on opposite sides of the expansion joint.

2. In combination with spaced apart wall portions forming an elongated expansion joint, an assembly for bridging the expansion joint which comprises an elongated insert strip of channel shape mounted in the expansion joint with the interior thereof exposed, there being lengthwise slots in interior faces thereof, an elongated bridging strip having a leg portion received in the insert strip, there being outwardly extending locking flanges on the leg engaging the slots of the insert strip to lock the bridging strip therein, the bridging strip having outwardly extending wall engaging flanges spaced from the locking flanges bridging the expansion joint, there being lengthwise slots in exterior faces of the insert strip, and a positioning member having jaws slidably received in the lengthwise slots in the exterior faces of the insert strip, the positioning member having outwardly extending portions received in the wall portions on opposite sides of the expansion joint.

3. A combination as in claim 2 wherein there are outwardly extending positioning flanges on the leg portion intermediate the locking flanges and the wall engaging flanges, the positioning flanges engaging opposed interior walls of the insert strip to hold the leg portion in predetermined position inside the insert strip.

References Cited

UNITED STATES PATENTS

| | | | |
|---|---|---|---|
| 1,772,417 | 8/1930 | Ellinwood | 52—461 |
| 1,893,480 | 1/1933 | Mitchell | 52—466 |
| 2,198,084 | 4/1940 | Jacobson | 94—18 |
| 2,394,443 | 2/1946 | Guignon | 52—464 X |
| 2,803,858 | 8/1957 | Rader | 52—464 |
| 3,394,522 | 6/1968 | Maurer | 52—583 |

ALFRED C. PERHAM, Primary Examiner

S. D. BURKE, Assistant Examiner

U.S. Cl. X.R.

52—403, 461, 466, 573, 583; 94—18